US012785292B2

(12) United States Patent
Kuo et al.

(10) Patent No.: US 12,785,292 B2
(45) Date of Patent: Nov. 3, 2026

(54) ANTENNA SYSTEM INCLUDING MULTIPLE RANGE ANTENNAS AND MULTIPLE ANGLE-OF-ARRIVAL ANTENNAS FOR ELECTRONIC DEVICES

(71) Applicant: Google LLC, Mountain View, CA (US)

(72) Inventors: Jerry W. Kuo, San Jose, CA (US); Victor Chang, Mountain View, CA (US); Peter Joseph Bevelacqua, Sunnyvale, CA (US); Der-Woei Wu, Mountain View, CA (US)

(73) Assignee: Google LLC, Mountain View, CA (US)

( * ) Notice: Subject to any disclaimer, the term of this patent is extended or adjusted under 35 U.S.C. 154(b) by 65 days.

(21) Appl. No.: 18/851,286

(22) PCT Filed: Apr. 5, 2022

(86) PCT No.: PCT/US2022/023411

§ 371 (c)(1),
(2) Date: Sep. 26, 2024

(87) PCT Pub. No.: WO2023/195973

PCT Pub. Date: Oct. 12, 2023

(65) Prior Publication Data

US 2025/0219300 A1 Jul. 3, 2025

(51) Int. Cl.

*H01Q 21/24* (2006.01)
*G01S 3/46* (2006.01)
*H01Q 1/24* (2006.01)
*H01Q 3/24* (2006.01)

(52) U.S. Cl.

CPC ............... *H01Q 21/24* (2013.01); *G01S 3/46* (2013.01); *H01Q 1/243* (2013.01); *H01Q 3/24* (2013.01)

(58) Field of Classification Search

CPC ............ H01Q 1/24; H01Q 1/243; H01Q 3/24; H01Q 21/24

See application file for complete search history.

(56) References Cited

U.S. PATENT DOCUMENTS

2008/0068250 A1 3/2008 Brandao et al.
2020/0219343 A1 7/2020 Stitt et al.
2021/0098861 A1 4/2021 Zheng et al.

FOREIGN PATENT DOCUMENTS

KR 20210001976 A * 1/2021 ............... H01Q 5/25

OTHER PUBLICATIONS

International Search Report and Written Opinion for PCT/US2022/023411 dated Nov. 28, 2022, 14 pages.

* cited by examiner

*Primary Examiner* — Hoang V Nguyen
(74) *Attorney, Agent, or Firm* — Lerner David LLP

(57) ABSTRACT

An antenna system including multiple range antennas and multiple angle-of-arrival antennas for electronic devices is provided. In some embodiments, the antenna system can include a plurality of substantially orthogonal range antennas and a plurality of angle-of-arrival antennas, where a processing system on an initiator device can determine which of the plurality of substantially orthogonal range antennas to select for subsequent angle-of-arrival measurements. This can, for example, reduce polarization mismatch between the antenna systems of initiator devices and responder devices.

20 Claims, 9 Drawing Sheets

ANTENNA SYSTEM INCLUDING MULTIPLE RANGE ANTENNAS AND MULTIPLE ANGLE-OF-ARRIVAL ANTENNAS FOR ELECTRONIC DEVICES

CROSS-REFERENCE TO RELATED APPLICATION

This application is a 371 National Stage filing of PCT Application No. PCT/US2022/023411, filed Apr. 5, 2022, and titled "ANTENNA SYSTEM INCLUDING MULTIPLE RANGE ANTENNAS AND MULTIPLE ANGLE-OF-ARRIVAL ANTENNAS FOR ELECTRONIC DEVICES," which is hereby incorporated by reference in its entirety for all purposes.

TECHNICAL FIELD

The disclosed subject matter relates to an antenna system including multiple range antennas and multiple angle-of-arrival antennas for electronic devices.

BACKGROUND

In some electronic devices, an antenna system may be implemented for wireless communication. For example, when providing device-to-device services between an initiator device and a responder device, an ultra-wideband antenna system on each device can be implemented to include a single range antenna (Tx) and a pair of angle-of-arrival antennas (Rx1 and Rx2). Using the ultra-wideband antenna system, the initiator device can ask the responder device to transmit a signal from its range antenna. To measure the angle-of-arrival, the pair of angle-of-arrival antennas on the initiator device detects the phase difference between the received signals from the range antenna on the responder device and uses a phase-to-angle map to determine the angle-of-arrival relative to the center of the pair of angle-of-arrival antennas on the initiator device.

Angle-of-arrival measurements, however, are often inaccurate if the antennas on the initiator device and the responder device are polarized in orthogonal directions. Such scenarios, unfortunately, are unavoidable as there is little control over device orientation.

Accordingly, it is desirable to provide new antenna systems that include multiple range antennas and multiple angle-of-arrival antennas for electronic devices.

SUMMARY

In accordance with some embodiments of the disclosed subject matter, an antenna system including multiple range antennas and multiple angle-of-arrival antennas for electronic devices is provided.

In accordance with some embodiments of the disclosed subject matter, an antenna system is provided, the antenna system comprising: a printed circuit board; a plurality of range antennas connected to the printed circuit board, wherein a first range antenna of the plurality of range antennas is substantially orthogonal to a second range antenna of the plurality of range antennas such that the first range antenna is approximately ninety degrees out of phase with the second range antenna; and a plurality of angle-of-arrival antennas connected to the printed circuit board.

In some embodiments, each of the plurality of range antennas are configured to transmit radio signals to an initiator device having a pair of angle-of-arrival antennas.

In some embodiments, the plurality of range antennas include a first range antenna and a second range antenna, the first range antenna is configured to transit a first signal at a first time to the pair of angle-of-arrival antennas, and the second range antenna is configured to transmit a second signal at a second time to the pair of angle-of-arrival antennas.

In some embodiments, the plurality of range antennas include a first range antenna and a second range antenna and wherein the antenna system further comprises a switch that is connected to the first range antenna and the second range antenna.

In some embodiments, the switch is configured to select one of the first range antenna and the second range antenna for transmitting subsequent signals to an initiator device based on a selection from the initiator device.

In some embodiments, the first range antenna is configured to transit a first signal at a first time to the pair of angle-of-arrival antennas, the second range antenna is configured to transmit a second signal at a second time to the pair of angle-of-arrival antennas, and the switch is configured to select one of the first range antenna and the second range antenna for transmitting subsequent signals to an initiator device based on signal strength of the first signal received by the pair of angle-of-arrival antennas in comparison with the signal strength of the second signal received by the pair of angle-of-arrival antennas.

In some embodiments, each of the plurality of angle-of-arrival antennas are configured to receive radio signals from a responder device having range antennas.

In accordance with some embodiments of the disclosed subject matter, an electronic device is provided, the electronic device comprising: a printed circuit board; a plurality of angle-of-arrival antennas connected to the printed circuit board; and a processing system that is connected to the plurality of angle-of-arrival antennas, wherein the processing system is configured to: transmit a first request to a responder device having a plurality of range antennas, wherein a first range antenna of the plurality of range antennas is substantially orthogonal to a second range antenna of the plurality of range antennas such that the first range antenna is approximately ninety degrees out of phase with the second range antenna, and wherein the first request instructs the responder device to transmit a first signal from the first range antenna at a first time and a second signal from the second range antenna at a second time; select a preferred range antenna from the first range antenna and the second range antenna based on a comparison of the first signal and the second signal received by the plurality of angle-of-arrival antennas; and transmit a second request to the responder device that selects the preferred range antenna for transmitting subsequent signals to the plurality of angle-of-arrival antennas.

In some embodiments, the processing system is further configured to select a first angle-of-arrival channel that is associated with a first angle-of-arrival antenna of the plurality of angle-of-arrival antennas.

In some embodiments, the processing system is further configured to determine which of the first range antenna or the second range antenna based on signal strength with the first angle-of-arrival antenna corresponding to the first angle-of-arrival channel.

In some embodiments, the comparison of the first signal and the second signal received by the plurality of angle-of-arrival antennas further comprises determining a first signal strength of the first signal received by the plurality of angle-of-arrival antennas and a second signal strength of the second signal received by the plurality of angle-of-arrival antennas and comparing the first signal strength and the second signal strength to select the preferred range antenna.

In some embodiments, the processing system is further configured to receive antenna information associated with the responder device and, based on the antenna information, transmit a third request that the responder device reconfigure an alternate antenna to transmit a third signal from the alternate antenna to the plurality of angle-of-arrival antennas, wherein the alternate antenna is different from the plurality of range antennas on the responder device.

In some embodiments, the processing system is further configured to identify the alternate antenna for transmitting the third signal based on antenna capability information in the antenna information.

In accordance with some embodiments of the disclosed subject matter, a method for using an antenna system on an initiator device is provided, the method comprising: transmitting a first request to a responder device having a plurality of range antennas, wherein a first range antenna of the plurality of range antennas is substantially orthogonal to a second range antenna of the plurality of range antennas such that the first range antenna is approximately ninety degrees out of phase with the second range antenna, and wherein the first request instructs the responder device to transmit a first signal from the first range antenna at a first time to a plurality of angle-of-arrival antennas on the initiator device and a second signal from the second range antenna at a second time to the plurality of angle-of-arrival antennas on the initiator device; selecting a preferred range antenna from the first range antenna and the second range antenna based on a comparison of the first signal and the second signal received by the plurality of angle-of-arrival antennas; and transmitting a second request to the responder device that selects the preferred range antenna for transmitting subsequent signals to the plurality of angle-of-arrival antennas.

In accordance with some embodiments of the disclosed subject matter, a non-transitory computer-readable medium containing computer executable instructions that, when executed by a processor on an initiator device, cause the processor to perform a method for using an antenna system on the initiator device is provided, the method comprising: transmitting a first request to a responder device having a plurality of range antennas, wherein a first range antenna of the plurality of range antennas is substantially orthogonal to a second range antenna of the plurality of range antennas such that the first range antenna is approximately ninety degrees out of phase with the second range antenna, and wherein the first request instructs the responder device to transmit a first signal from the first range antenna at a first time to a plurality of angle-of-arrival antennas on the initiator device and a second signal from the second range antenna at a second time to the plurality of angle-of-arrival antennas on the initiator device; selecting a preferred range antenna from the first range antenna and the second range antenna based on a comparison of the first signal and the second signal received by the plurality of angle-of-arrival antennas; and transmitting a second request to the responder device that selects the preferred range antenna for transmitting subsequent signals to the plurality of angle-of-arrival antennas.

In accordance with some embodiments of the disclosed subject matter, a system for using an antenna system on an initiator device is provided, the system comprising: means for transmitting a first request to a responder device having a plurality of range antennas, wherein a first range antenna of the plurality of range antennas is substantially orthogonal to a second range antenna of the plurality of range antennas such that the first range antenna is approximately ninety degrees out of phase with the second range antenna, and wherein the first request instructs the responder device to transmit a first signal from the first range antenna at a first time to a plurality of angle-of-arrival antennas on the initiator device and a second signal from the second range antenna at a second time to the plurality of angle-of-arrival antennas on the initiator device; means for selecting a preferred range antenna from the first range antenna and the second range antenna based on a comparison of the first signal and the second signal received by the plurality of angle-of-arrival antennas; and means for transmitting a second request to the responder device that selects the preferred range antenna for transmitting subsequent signals to the plurality of angle-of-arrival antennas.

In accordance with some embodiments of the disclosed subject matter, an electronic device is provided, the electronic device comprising: a printed circuit board; a plurality of range antennas connected to the printed circuit board, wherein a first range antenna of the plurality of range antennas is substantially orthogonal to a second range antenna of the plurality of range antennas such that the first range antenna is approximately ninety degrees out of phase with the second range antenna; and a processing system that is connected to the plurality of range antennas, wherein the processing system is configured to: receive a first request to transmit a first signal from the first range antenna at a first time and a second signal from the second range antenna at a second time; transmit, at the first time, the first signal from the first range antenna to a plurality of angle-of-arrival antennas on an initiator device; transmit, at the second time, the second signal from the second range antenna to the plurality of angle-of-arrival antennas on the initiator device; and select a preferred range antenna for transmitting subsequent signals to the plurality of angle-of-arrival antennas on the initiator device.

In some embodiments, the preferred range antenna is selected in response to receiving a second request from the initiator device that indicates the preferred range antenna between at least the first range antenna and the second range antenna.

In some embodiments, the electronic device further comprises a switch that is connected to the first range antenna and the second range antenna.

In some embodiments, the preferred range antenna is selected by changing a state of the switch from a currently selected range antenna to the preferred range antenna for transmitting subsequent signals to the initiator device.

In some embodiments, the switch is configured to select one of the first range antenna and the second range antenna for transmitting subsequent signals to the initiator device based on signal strength of the first signal received by the plurality of angle-of-arrival antennas in comparison with the signal strength of the second signal received by the plurality of angle-of-arrival antennas.

In some embodiments, the processing system is further configured to determine whether an alternate antenna on the responder device is capable of being reconfigured to transmit signals as a range antenna to the plurality of angle-of-arrival antennas on the initiator device.

In some embodiments, the processing system is further configured to reconfigure the alternate antenna to transmit a third signal to the plurality of angle-of-arrival antennas on the initiator device based on the determination.

In accordance with some embodiments of the disclosed subject matter, a method for using an antenna system on a responder device is provided, the method comprising: receiving a first request to transmit a first signal from a first range antenna of the plurality of range antennas at a first time and a second signal from the second range antenna of the plurality of range antennas at a second time, wherein the first range antenna of the plurality of range antennas is substantially orthogonal to the second range antenna of the plurality of range antennas such that the first range antenna is approximately ninety degrees out of phase with the second range antenna; transmitting, at the first time, the first signal from the first range antenna to a plurality of angle-of-arrival antennas on an initiator device; transmitting, at the second time, the second signal from the second range antenna to the plurality of angle-of-arrival antennas on the initiator device; and selecting a preferred range antenna for transmitting subsequent signals to the plurality of angle-of-arrival antennas on the initiator device.

In accordance with some embodiments of the disclosed subject matter, a non-transitory computer-readable medium containing computer executable instructions that, when executed by a processor on a responder device, cause the processor to perform a method for using an antenna system on the responder device is provided, the method comprising: receiving a first request to transmit a first signal from a first range antenna of the plurality of range antennas at a first time and a second signal from the second range antenna of the plurality of range antennas at a second time, wherein the first range antenna of the plurality of range antennas is substantially orthogonal to the second range antenna of the plurality of range antennas such that the first range antenna is approximately ninety degrees out of phase with the second range antenna; transmitting, at the first time, the first signal from the first range antenna to a plurality of angle-of-arrival antennas on an initiator device; transmitting, at the second time, the second signal from the second range antenna to the plurality of angle-of-arrival antennas on the initiator device; and selecting a preferred range antenna for transmitting subsequent signals to the plurality of angle-of-arrival antennas on the initiator device.

In accordance with some embodiments of the disclosed subject matter, a system for using an antenna system on a responder device is provided, the system comprising: means for receiving a first request to transmit a first signal from a first range antenna of the plurality of range antennas at a first time and a second signal from the second range antenna of the plurality of range antennas at a second time, wherein the first range antenna of the plurality of range antennas is substantially orthogonal to the second range antenna of the plurality of range antennas such that the first range antenna is approximately ninety degrees out of phase with the second range antenna; means for transmitting, at the first time, the first signal from the first range antenna to a plurality of angle-of-arrival antennas on an initiator device; means for transmitting, at the second time, the second signal from the second range antenna to the plurality of angle-of-arrival antennas on the initiator device; and means for selecting a preferred range antenna for transmitting subsequent signals to the plurality of angle-of-arrival antennas on the initiator device.

BRIEF DESCRIPTION OF THE DRAWINGS

Various objects, features, and advantages of the disclosed subject matter can be more fully appreciated with reference to the following detailed description of the disclosed subject matter when considered in connection with the following drawings, in which like reference numerals identify like elements.

DETAILED DESCRIPTION

Figure 1:
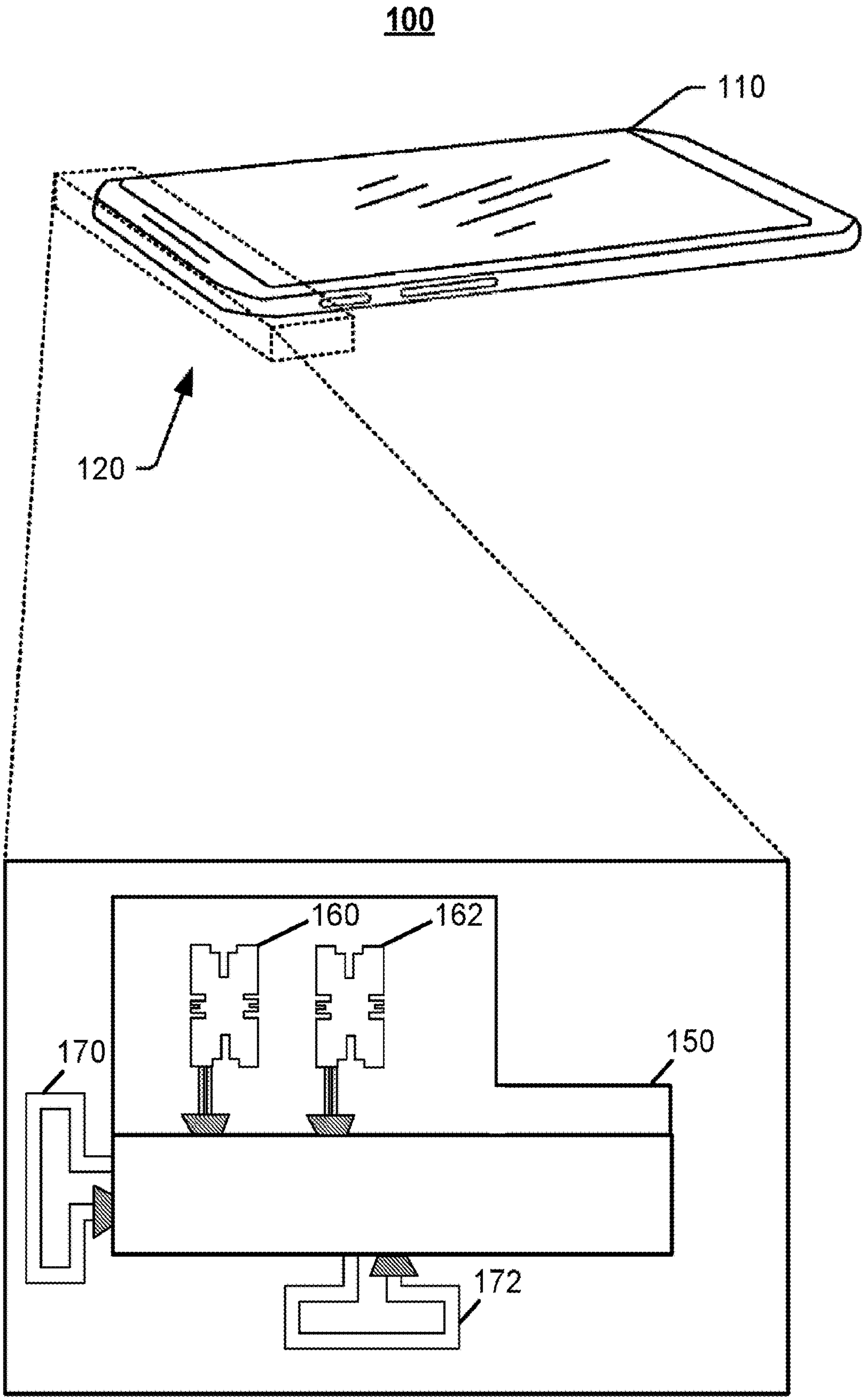
FIG. 1 shows an illustrative antenna for an electronic device that includes multiple range antennas and multiple angle-of-arrival antennas on a printed circuit board in accordance with some embodiments of the disclosed subject matter.

In accordance with various embodiments of the disclosed subject matter, an antenna system including multiple range antennas and multiple angle-of-arrival antennas for electronic devices is provided.

Generally speaking, the mechanisms described herein can provide an antenna system including multiple range antennas and multiple angle-of-arrival antennas and associated techniques and systems. The described antenna system can be implemented on a printed circuit board and can be used for wideband and ultra-wideband applications. The antenna system can include a plurality of substantially orthogonal range antennas and a plurality of angle-of-arrival antennas, where a processing system on an initiator device can determine which of the plurality of substantially orthogonal range antennas to select for subsequent angle-of-arrival measurements. This can, for example, reduce polarization mismatch between the antenna systems of initiator devices and responder devices.

In some implementations, an initiator device can include a plurality of angle-of-arrival antennas and a processing system that is connected to the plurality of angle-of-arrival antennas, where the processing system is configured to determine which range antenna from a plurality of substantially orthogonal range antennas on a responder device to select for subsequent angle-of-arrival measurements.

In some implementations, the processing system on the initiator device can be configured to select an angle-of-arrival channel. The processing system on the initiator device can then transmit a request to the responder device that the responder device transmits a first signal in a first time window using a first range antenna of the plurality of substantially orthogonal range antennas on the responder device and a second signal in a second time window using a second range antenna of the plurality of substantially orthogonal range antennas on the responder device. Upon receiving the first signal in the first time window and the second signal in the second time window, the processing system on the initiator device can compare the first signal and the second signal based on the selected angle-of-arrival channel (e.g., to determine which range antenna has a stronger signal strength with the pair of angle-of-arrival antennas on the initiator device). The processing system on the initiator device can select one of the plurality of substantially orthogonal range antennas on the responder device for angle-of-arrival measurements based on the comparison.

Additionally or alternatively to selecting one of the plurality of substantially orthogonal range antennas on the responder device for angle-of-arrival measurements, the processing system can determine whether another antenna present on the responder device can transmit a signal to the plurality of angle-of-arrival antennas on the initiator device. For example, for responder devices having one range antenna, the processing system on the initiator device can determine other antennas on the responder device that are currently configured to provide different signals (e.g., a WiFi antenna, a GPS antenna, etc.) and which of those antennas is capable of providing a signal to the plurality of angle-of-arrival antennas on the initiator device. In continuing this example, the initiator device can determine a polarization of this alternate antenna and, in response to determining that the polarization of the alternate antenna is sufficient (e.g., substantially orthogonal polarization to the range antenna on the responder device), can transmit an instruction that causes the alternate antenna to transmit a signal to the plurality of angle-of-arrival antennas on the initiator device. This can, for example, reconfigure an existing antenna that is currently configured to transmit other types of signals to transmit a signal to the plurality of angle-of-arrival antennas on the initiator device. The processing system on the initiator device can compare the first signal from the single range antenna and the second signal from the alternate antenna (e.g., to determine which range antenna has a stronger signal strength with the pair of angle-of-arrival antennas on the initiator device). The processing system on the initiator device can select one of the antennas on the responder device for angle-of-arrival measurements based on the comparison.

In some implementations, a responder device can include a plurality of substantially orthogonal range antennas, a plurality of angle-of-arrival antennas, and a processing system that is connected to the plurality of substantially orthogonal range antennas and the plurality of angle-of-arrival antennas, where the processing system is configured to use one of the plurality of substantially orthogonal range antennas for subsequent angle-of-arrival measurements on the initiator device.

In some implementations, the processing system on a responder device can be configured to receive a first request from an initiator device and, in response to the received first request, transmit a first signal in a first time window to the initiator device using a first range antenna of the plurality of substantially orthogonal range antennas on the responder device and a second signal in a second time window to the initiator device using a second range antenna of the plurality of substantially orthogonal range antennas on the responder device. The processing system can, in response to receiving a second request from the initiator device, switch to a selected range antenna based on the first signal and the second signal transmitted to the initiator device. For example, the responder device can include a switch, such as a single-pole, double-throw switch, where the processing system can switch the state of the switch to select the selected range antenna for transmitting additional signals to the initiator device (e.g., for subsequent angle-of-arrival measurements between the initiator device and the responder device).

In some implementations, the responder device can include a switch that is connected to each of the plurality of substantially orthogonal range antennas, wherein the processing system can transmit an instruction that causes the switch to select one of the plurality of substantially orthogonal range antennas. For example, the switch can be a single-pole, double-throw switch that is configured to select between one of the plurality of substantially orthogonal range antennas. In another example, the switch can be configured to select between any suitable number of antennas on the responder device that are each capable of providing a signal to the plurality of angle-of-arrival antennas on the initiator device.

Additionally or alternatively to changing a state of a switch to select a range antenna for transmitting additional signals to the initiator device, the processing system on the responder device can determine whether another antenna present on the responder device is capable of transmitting a signal to the plurality of angle-of-arrival antennas on the initiator device. For example, for responder devices having one range antenna, the processing system on the responder device can determine other antennas on the responder device that are currently configured to provide different signals (e.g., a WiFi antenna, a GPS antenna, etc.) and which of those antennas is capable of providing a signal to the plurality of angle-of-arrival antennas on the initiator device. In continuing this example, the responder device can determine a polarization of this alternate antenna and, in response to determining that the polarization of the alternate antenna is sufficient (e.g., substantially orthogonal polarization to the single range antenna on the responder device), can transmit an instruction that causes the alternate antenna to transmit a signal to the plurality of angle-of-arrival antennas on the initiator device. This can, for example, reconfigure an existing antenna that is currently configured to transmit other types of signals to transmit a signal to the plurality of angle-of-arrival antennas on the initiator device.

It should be noted that, in some embodiments, the processing system on the responder device can receive a request to provide information on antenna systems in the responder device such that the processing system on the initiator device can determine whether another antenna present on the responder device is capable of transmitting a signal to the plurality of angle-of-arrival antennas on the initiator device.

These and other features of an antenna system including multiple range antennas and multiple angle-of-arrival antennas for electronic devices are described further in connection with FIGS. 1-6.

Turning to FIG. 1, FIG. 1 shows an illustrative antenna system for an electronic device that includes multiple range antennas and multiple angle-of-arrival antennas on a printed circuit board in accordance with some embodiments of the disclosed subject matter. Such an antenna system can, for example, be an ultra-wideband antenna system to be used for ultra-wideband communications.

As shown in FIG. 1, an example environment 100 can include a mobile electronic device 110, where mobile electronic device 110 includes an antenna system 120. Antenna system 120 can include a printed circuit board 150, multiple angle-of-arrival antennas 160 and 162 that are connected to printed circuit board 150, and multiple range antennas 170 and 172 that are connected to printed circuit board 150.

In some embodiments, multiple angle-of-arrival antennas 160 and 162 can be a pair of angle-of-arrival antennas or any other suitable receive antennas that are connected to printed circuit board 150, where the pair of angle-of-arrival antennas can receive radio signals from one or more range antennas or any other suitable transmit antennas. The pair of angle-of-arrival antennas can receive the signal from the range antenna. As arriving signals from the range antenna at an angle (θ) cause a path difference (p) between the pair of angle-of-arrival antennas, a processor of mobile electronic device 110 can calculate the phase difference of arrival to measure the range antenna angle-of-arrival (AoA) relative to the center of the pair of angle-of-arrival antennas. In a more particular example, the pair of angle-of-arrival antennas can include a horizontal-polarization receive antenna and a vertical-polarization receive antenna.

In some embodiments, antenna system 120 can include a first range antenna 170 connected to printed circuit board 150 and a second range antenna 172 connected to printed circuit board 150, where first range antenna 170 can be substantially orthogonal to second range antenna 172 such that first range antenna 170 is approximately ninety degrees out of phase with second range antenna 172. First range antenna 170 and second range antenna 172 can be configured to transmit radio signals from a responder device to angle-of-arrival antennas 160 and 162 on an initiator device. In some embodiments, first range antenna 170 can be configured to transmit radio signals from the responder device to angle-of-arrival antennas 160 and 162 on the initiator device at a first time period and second range antenna 172 can be configured to transmit radio signals from the responder device to angle-of-arrival antennas 160 and 162 on the initiator device at a second time period.

It should be noted that mobile electronic device 110 can include any suitable antennas. For example, mobile electronic device 110 can include several antennas associated with different bands on the electromagnetic spectrum. Some of the antennas may be associated with cellular communications, ultra-wideband communications, or wireless networking. In another example, the antennas may be associated with different applications, including but not limited to cellular communications, wireless communications, peer-to-peer communications, and GNSS reception. In some embodiments, mobile electronic device 110 can determine whether an alternative antenna with mobile electronic device 110 acting as a responder device may be capable of transmitting a radio signal to angle-of-arrival antennas 160 and 162 on the responder device. For example, for a responder device having a single range antenna that is vertically polarized, mobile electronic device 110 can determine that an alternative antenna exists that is capable of transmitting a radio signal to angle-of-arrival antennas 160 and 162 on the responder device and that has a different polarization than the single range antenna (e.g., a horizontally-polarized antenna). In continuing this example, mobile electronic device 110 acting as the responder device can reconfigure the alternative antenna to transmit a radio signal to angle-of-arrival antennas 160 and 162 on the initiator device at a particular time in connection with the range antenna transmitting a radio signal to angle-of-arrival antennas 160 and 162 on the initiator device (e.g., range antenna transmits a signal first followed by the alternative antenna transmitting a signal).

Figure 2A:
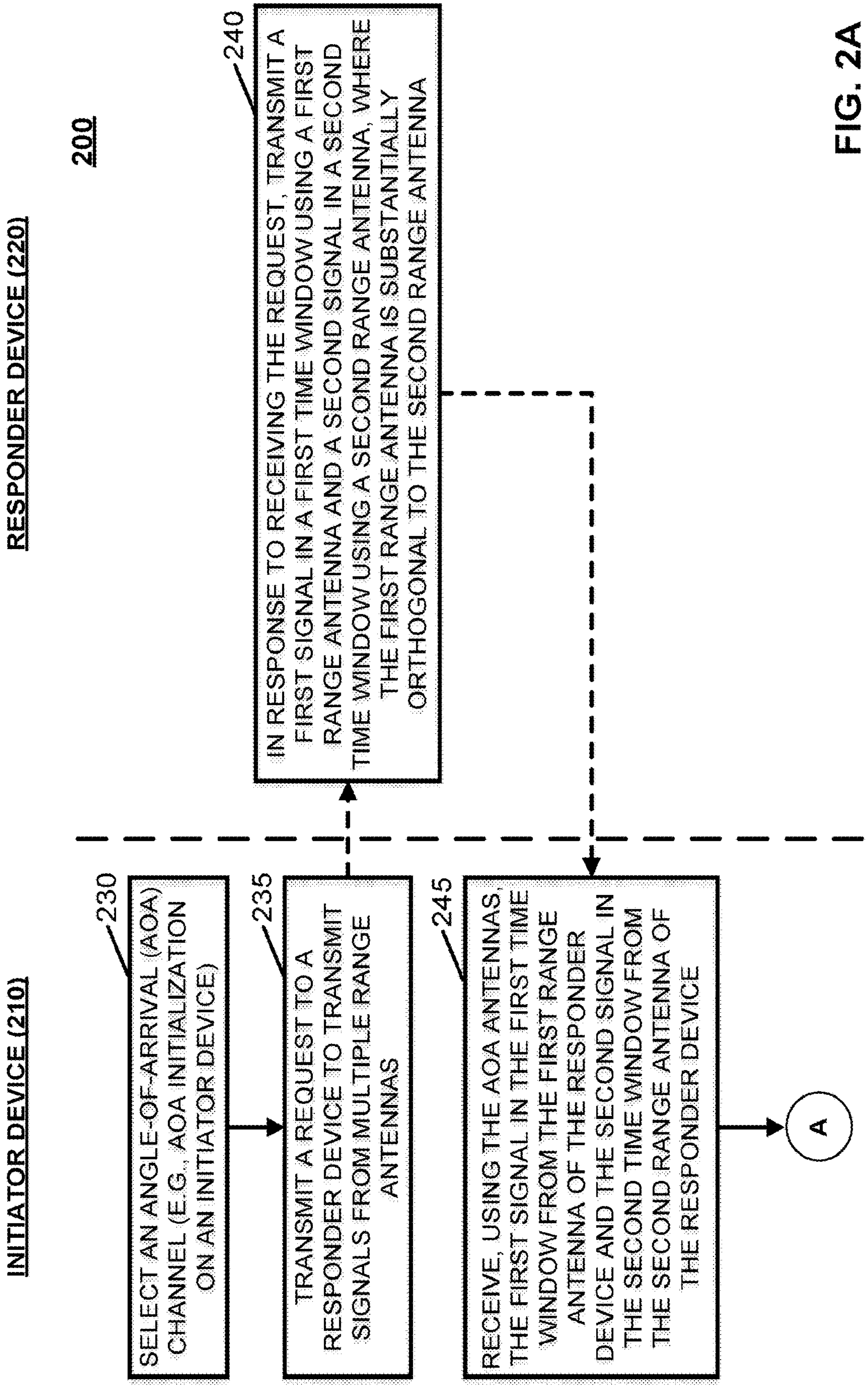
FIGS. 2A and 2B show an example flow diagram of a process for selecting a range antenna from multiple range antennas on a responder device for the transmission of subsequent signals to multiple angle-of-arrival antennas on an initiator device in accordance with some embodiments of the disclosed subject matter.
Figure 2B:
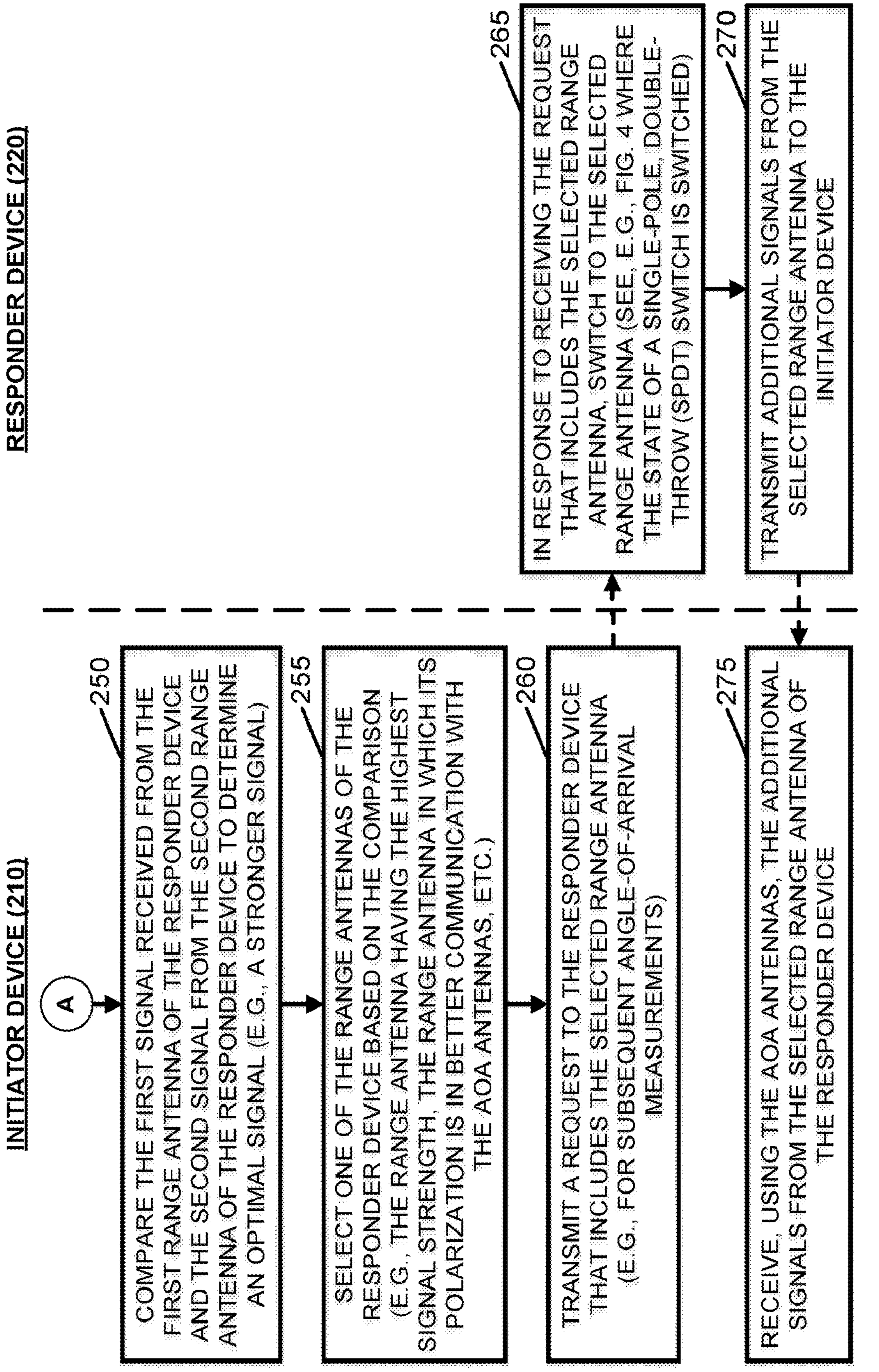

Turning to FIGS. 2A and 2B, an example flow diagram of a process 200 for selecting a range antenna of a responder device 220 for angle-of-arrival measurements or any other suitable distance measurements of a signal that is received from the selected range antenna by an initiator device 210 is shown in accordance with some embodiments of the disclosed subject matter.

It should be noted that process 200 of FIGS. 2A and 2B can be executed at any suitable time. For example, in some embodiments, process 200 can be executed by initiator device 210 during an initial handshake protocol between initiator device 210 and responder device 220. In another example, in some embodiments, process 200 can be executed periodically between initiator device 210 and responder device 220 at given time intervals subsequent to the initial handshake. In yet another example, in some embodiments, process 200 can be executed when initiator device 210 detects that a polarization mismatch may exist between the antenna systems of initiator device 210 and responder device 220. In a further example, in some embodiments, process 200 can be executed between the antenna systems of initiator device 210 and responder device 220 in response to detecting a reset (e.g., a device reset).

In some embodiments, process 200 can begin, at 230 in FIG. 2A, by selecting an angle-of-arrival channel. For example, during an initial handshake protocol between initiator device 210 and responder device 220, initiator 210 can perform an angle-of-arrival initialization by selecting an angle-of-arrival channel. In a more particular example, as shown in FIGS. 3A-3F, channel 5 of initiator device 210 can be associated with one or more angle-of-arrival antennas that are vertically polarized and channel 9 of interior device 210 can be associated with one or more angle-of-arrival antennas that are horizontally polarized. Process 200 can then be used by initiator device 210 to determine which range antenna or range antennas on responder device 220 are suitable for transmitting radio signals to the one or more angle-of-arrival antennas on initiator device 210 (e.g., based on signal strength, based on polarization, etc.).

It should be noted that, in some embodiments, during the initial handshake protocol or any other suitable initialization, initiator device 210 can request device information associated with responder device 220. Such device information can include a device identifier, antenna information (e.g., a number of antennas, a number of types of antennas, etc.), antenna capability information, etc.

At 235, initiator device 210 can transmit a request to responder device 220 to transmit signals from multiple range antennas to the one or more angle-of-arrival antennas on initiator device 210. For example, initiator device 210 can transmit a request to responder device 220 that responder device 220 transmits a first signal in a first time window using a first range antenna of the plurality of substantially orthogonal range antennas on the responder device and a second signal in a second time window using a second range antenna of the plurality of substantially orthogonal range antennas on the responder device. In a more particular example, in response to receiving antenna capability information associated with responder device 220, initiator device 210 can transmit a request to responder device 220 that specifies (i) a particular range antenna that responder device 220 use to transmit a radio signal for receipt by the one or more angle-of-arrival antennas on initiator device 210, (ii) a particular time window that the radio signal is transmitted using the particular range antenna, (iii) a different range antenna that responder device 220 use to transmit a radio signal for receipt by the one or more angle-of-arrival antennas on initiator device 210, and (iv) a particular time window that the radio signal is transmitted using the different range antenna.

Alternatively, in some embodiments, initiator device 210 can determine that responder device 220 has a single range antenna and/or has another antenna that is capable of transmitting a signal to the angle-of-arrival antennas on initiator device 210. For example, for a particular responder device having a single range antenna and/or a particular responder device having additional antennas that are not currently being implemented as range antennas, the processing system on initiator device 210 can determine whether other antennas on responder device 220 that are currently configured to provide different signals (e.g., a WiFi antenna, a GPS antenna, etc.) and which of those antennas may be capable of providing a signal to the angle-of-arrival antennas on initiator device 210. In continuing this example, initiator device 210 can receive antenna information and antenna capability information associated with responder device 220 and can determine a polarization of this alternate antenna. In response to determining that the polarization of the alternate antenna is sufficient (e.g., a substantially orthogonal polarization to the single range antenna on responder device 220), initiator device 210 can transmit an instruction that causes the alternate antenna on responder device 220 to transmit a signal to the angle-of-arrival antennas on initiator device 210 at a different time window than the signal from the range antenna.

In response to receiving the request from initiator device 210, responder device 220 can, at 240, transmit a first signal in a first time window using a first range antenna of the multiple range antennas on responder device 220 and a second signal in a second time window using a second range antenna of the multiple range antennas on responder device 220. As such, the two substantially orthogonal range antennas on responder device 220 can be configured to transmit two radio signals in substantially orthogonal polarizations to the angle-of-arrival antennas on initiator device 210 (e.g., a pair of angle-of-arrival antennas).

At 245, initiator device 245 can, using the angle-of-arrival antennas, receive the first signal in the first time window from the first range antenna of the multiple range antennas on responder device 220 and can receive the second signal in the second time window from the second range antenna of the multiple range antennas on responder device 220.

Turning to FIG. 2B, upon receiving the first signal in the first time window and the second signal in the second time window at the angle-of-arrival antennas on initiator device 210, initiator device 210 can, at 250, compare the first signal and the second signal based on the selected angle-of-arrival channel (e.g., to determine which range antenna on responder device 220 has a stronger signal strength with the pair of angle-of-arrival antennas on initiator device on initiator device 210).

For example, FIGS. 3A-3F show illustrative examples of angle-of-arrival measurements at varying initiator device positions between range antennas of differing polarization on a responder device and angle-of-arrival antennas of differing polarization on an initiator device in accordance with some embodiments of the disclosed subject matter.

Figure 3A:
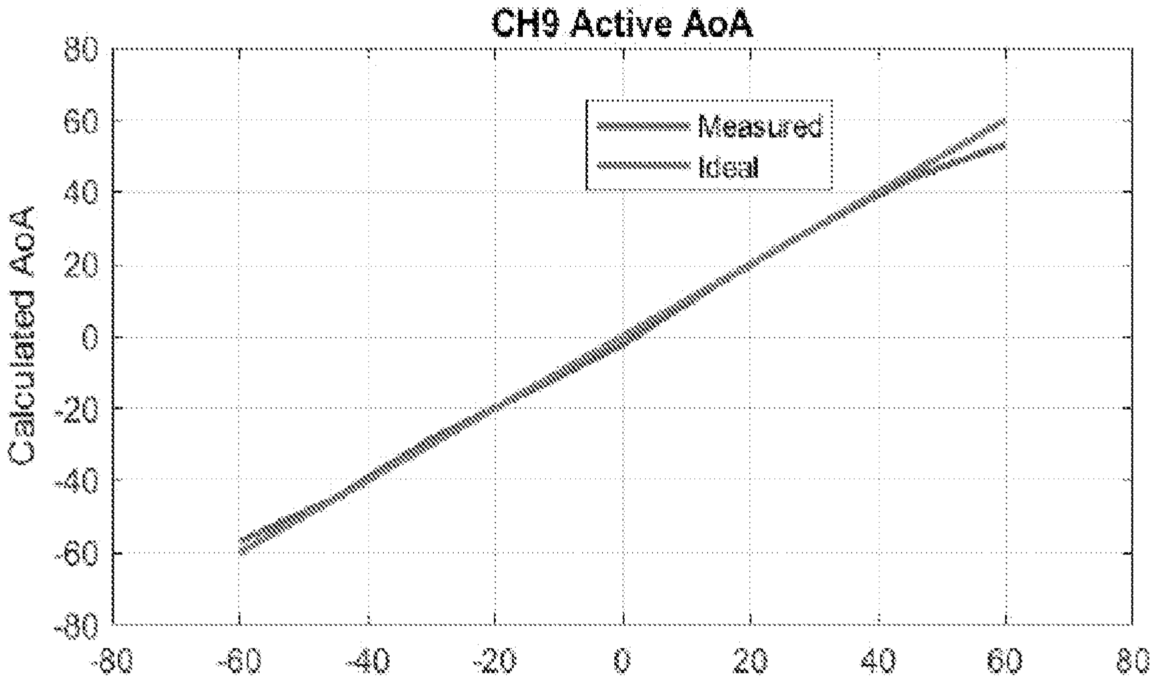
FIGS. 3A-3F show illustrative examples of angle-of-arrival measurements at varying initiator device positions between range antennas of differing polarization on a responder device and angle-of-arrival antennas of differing polarization on an initiator device in accordance with some embodiments of the disclosed subject matter.
Figure 3B:
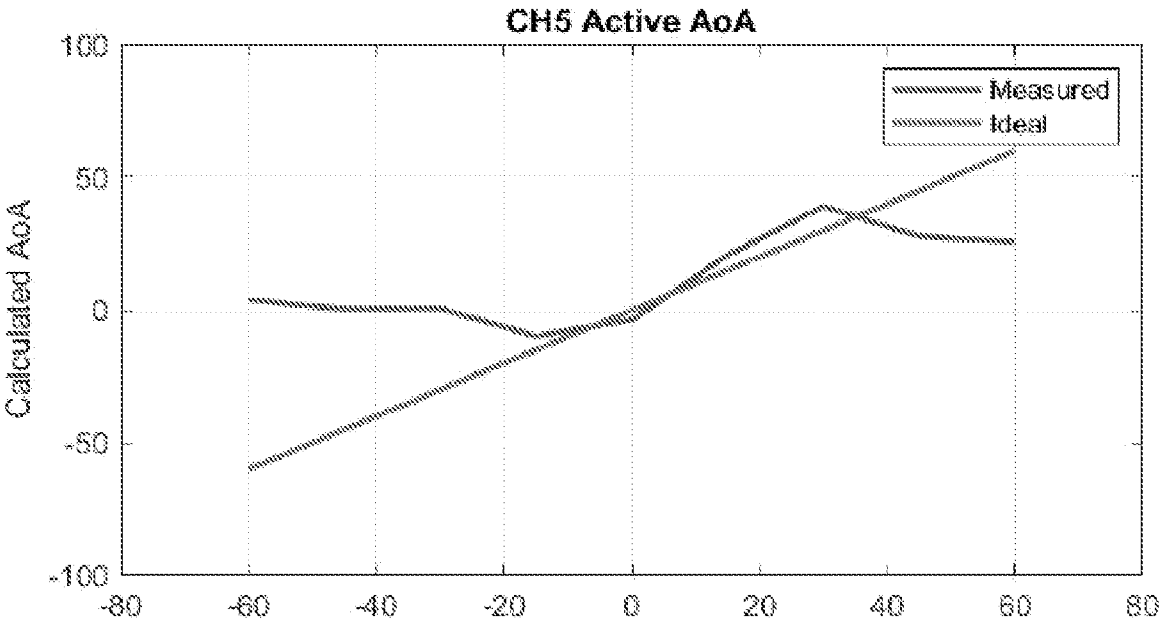

In continuing this example, FIG. 3A shows angle-of-arrival measurements at varying initiator device positions between a range antenna on the responder device that is horizontally placed or positioned (and, therefore, horizontally polarized) and channel 9 as the angle-of-arrival channel that is associated with an angle-of-arrival antenna that is horizontally polarized and FIG. 3B shows angle-of-arrival measurements at varying initiator device positions between a range antenna on the responder device that is horizontally polarized and channel 5 as the angle-of-arrival channel that is associated with an angle-of-arrival antenna that is vertically polarized. As shown in FIG. 3A, when comparing the angle-of-arrival measurements with ideal angle-of-arrival measurements, there is no polarization mismatch between the horizontally polarized range antenna on the responder device and the horizontally polarized angle-of-arrival antenna on the initiator device. On the other hand, as shown in FIG. 3B, when comparing the angle-of-arrival measurements with ideal angle-of-arrival measurements, polarization mismatch exists between the horizontally polarized range antenna on the responder device and the vertically polarized angle-of-arrival antenna on the initiator device. For example, the signal received by the angle-of-arrival antenna pair on the initiator device in FIG. 3B can be more than 10 dB weaker than the signal received by the angle-of-arrival antenna pair on the initiator device in FIG. 3A.

Figure 3C:
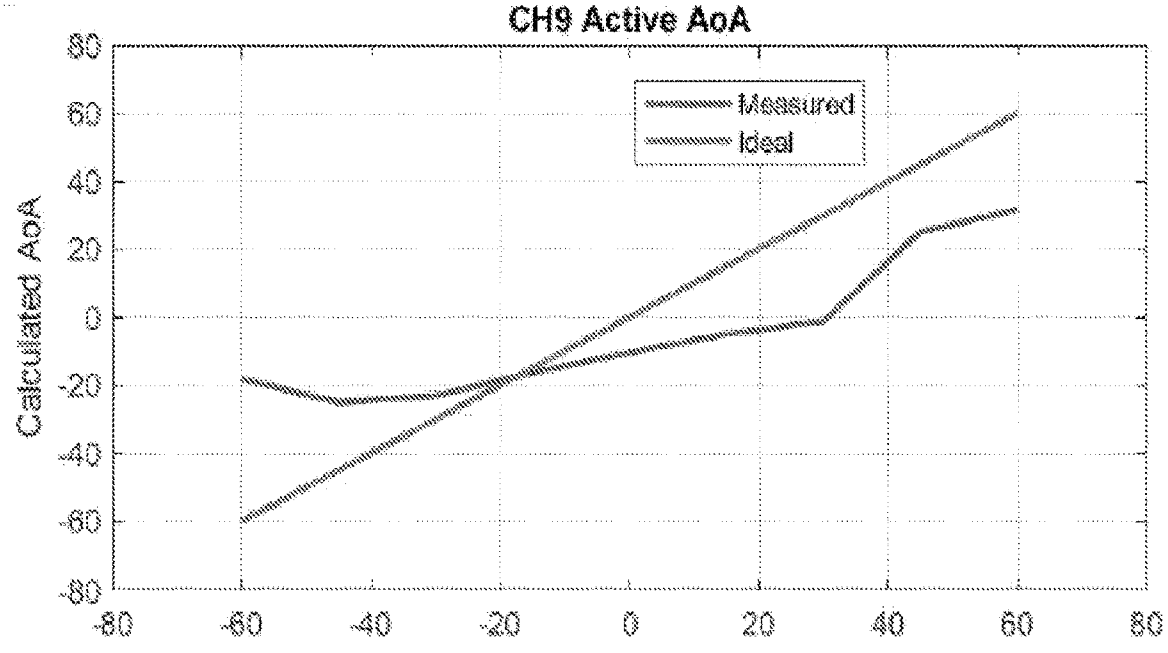
Figure 3D:
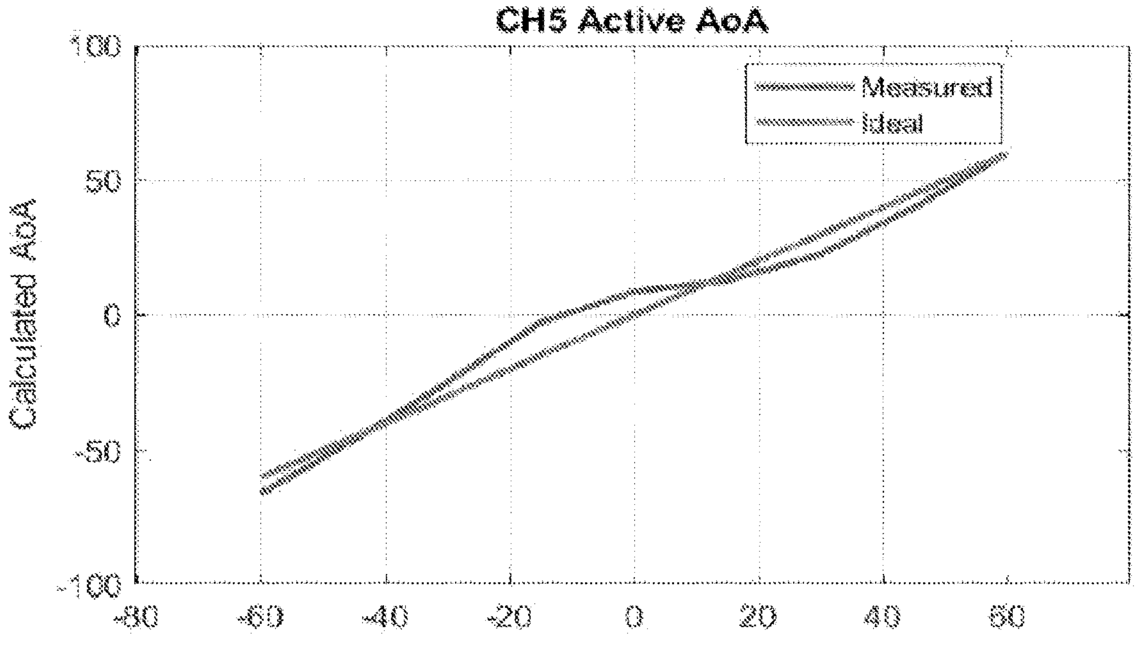

Similarly, FIG. 3C shows angle-of-arrival measurements at varying initiator device positions between a range antenna on the responder device that is vertically placed or positioned (and, therefore, vertically polarized) and channel 9 as the angle-of-arrival channel that is associated with an angle-of-arrival antenna that is horizontally polarized and FIG. 3D shows angle-of-arrival measurements at varying initiator device positions between a range antenna on the responder device that is vertically polarized and channel 5 as the angle-of-arrival channel that is associated with an angle-of-arrival antenna that is vertically polarized. As shown in FIG. 3C, when comparing the angle-of-arrival measurements with ideal angle-of-arrival measurements, polarization mismatch exists between the vertically polarized range antenna on the responder device and the horizontally polarized angle-of-arrival antenna on the initiator device. On the other hand, as shown in FIG. 3D, when comparing the angle-of-arrival measurements with ideal angle-of-arrival measurements, there is no polarization mismatch between the vertically polarized range antenna on the responder device and the vertically polarized angle-of-arrival antenna on the initiator device.

Figure 3E:
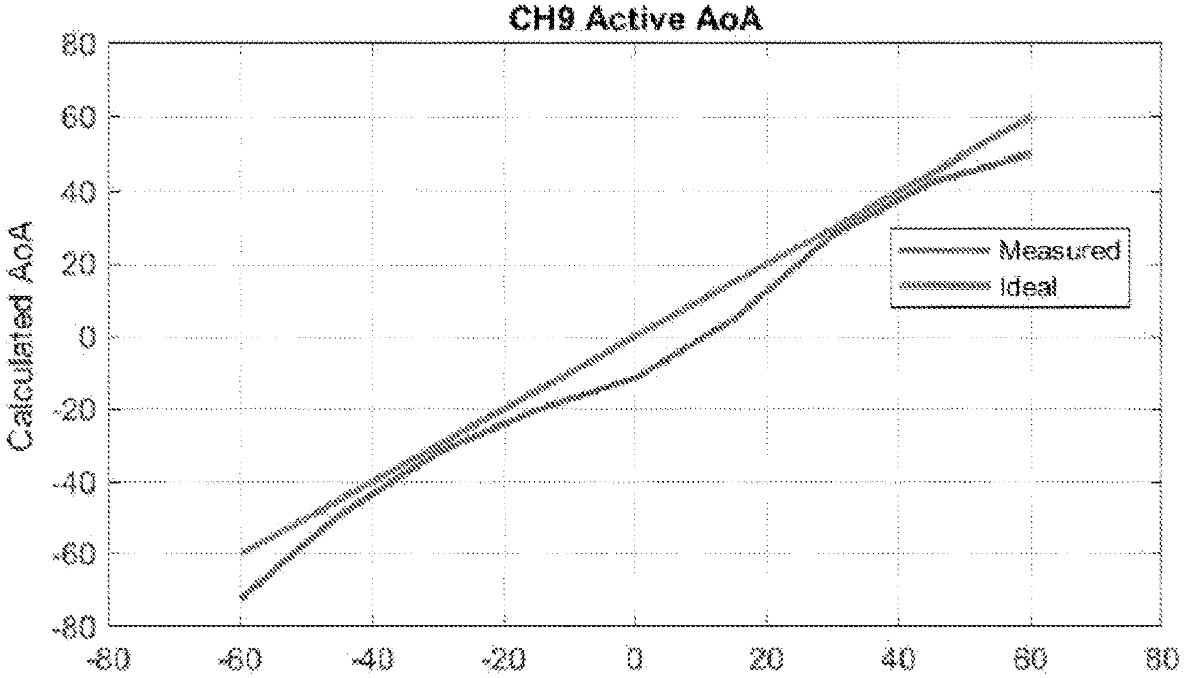
Figure 3F:
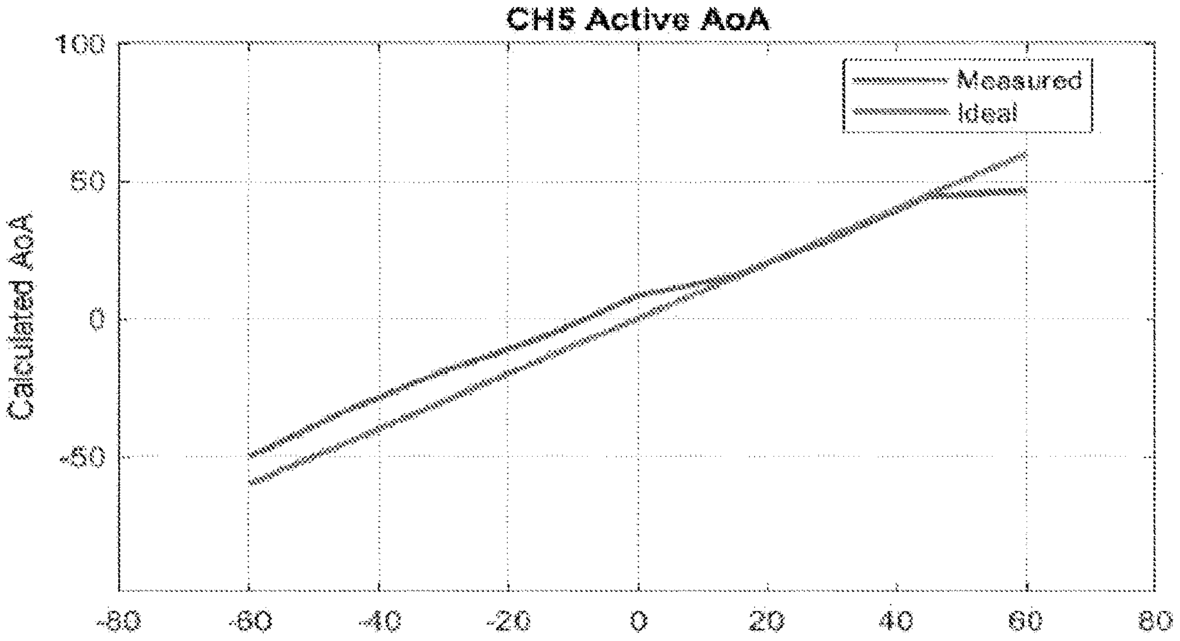

In another example, FIG. 3E shows angle-of-arrival measurements at varying initiator device positions between a range antenna on the responder device that is polarized in a 45-degree tilted orientation and channel 9 as the angle-of-arrival channel that is associated with an angle-of-arrival antenna that is horizontally polarized, while FIG. 3F shows angle-of-arrival measurements at varying initiator device positions between a range antenna on the responder device that is polarized in a 45-degree tilted orientation and channel 5 as the angle-of-arrival channel that is associated with an angle-of-arrival antenna that is vertically polarized. As shown in FIGS. 3E and 3F, when comparing the angle-of-arrival measurements with ideal angle-of-arrival measurements, there is no substantial polarization mismatch between the 45-degree tilted range antenna on the responder device and the angle-of-arrival antennas on the initiator device (e.g., whether vertically polarized or horizontally polarized).

Referring back to FIG. 2B, based on the comparison of the first signal from the first range antenna of responder device 220 and the second signal from the second range antenna of responder device 220, initiator device 210 can, at 255, select one of the range antennas on responder device 220 to transmitting subsequent signals for making distance measurements. For example, the comparison can determine that one range antenna has a higher signal strength in comparison with another range antenna and, in response, initiator device 210 can select a preferred range antenna having the higher signal strength. In another example, the comparison can determine that one range antenna has a better polarization in communication with the one or more angle-of-arrival antennas of initiator device 210 than another range antenna and, in response, initiator device 210 can select a preferred range antenna having a better polarization in communication with the one or more angle-of-arrival antennas of initiator device 210.

In some embodiments, at 260, initiator device 210 can transmit a request to responder device 220 that includes the selected range antenna for subsequent radio signal transmissions or any other suitable subsequent angle-of-arrival activities. For example, the request can include antenna identifier information and/or any other suitable to indicate a preferred range antenna for subsequent angle-of-arrival activities.

In response to receiving the request that includes the preferred range antenna, responder device 220 can switch to the preferred range antenna for subsequent angle-of-arrival activities with initiator device 210. For example, in some embodiments, in response to receiving the request that includes the preferred range antenna, responder device 220 can modify state information that selects the preferred range antenna for subsequent angle-of-arrival activities with initiator device 210. In another example, in some embodiments, responder device 220 can store an entry in a database that associates initiator device 210 with the preferred range antenna in the received request.

In some embodiments, responder device 220 can include a switch, such as a single-pole, double-throw (SPDT) switch, where the single-pole, double-throw switch is connected to each of the range antennas on responder device 220. For example, a processing system executing on responder device 220 can switch the state of the single-pole, double-throw switch to select the preferred range antenna for transmitting additional signals to the initiator device (e.g., for subsequent angle-of-arrival measurements between initiator device 210 and responder device 220). In another example, the switch can be configured to select between any suitable number of antennas on responder device 220 that are each capable of providing a signal to the plurality of angle-of-arrival antennas on initiator device 210.

Figure 4:
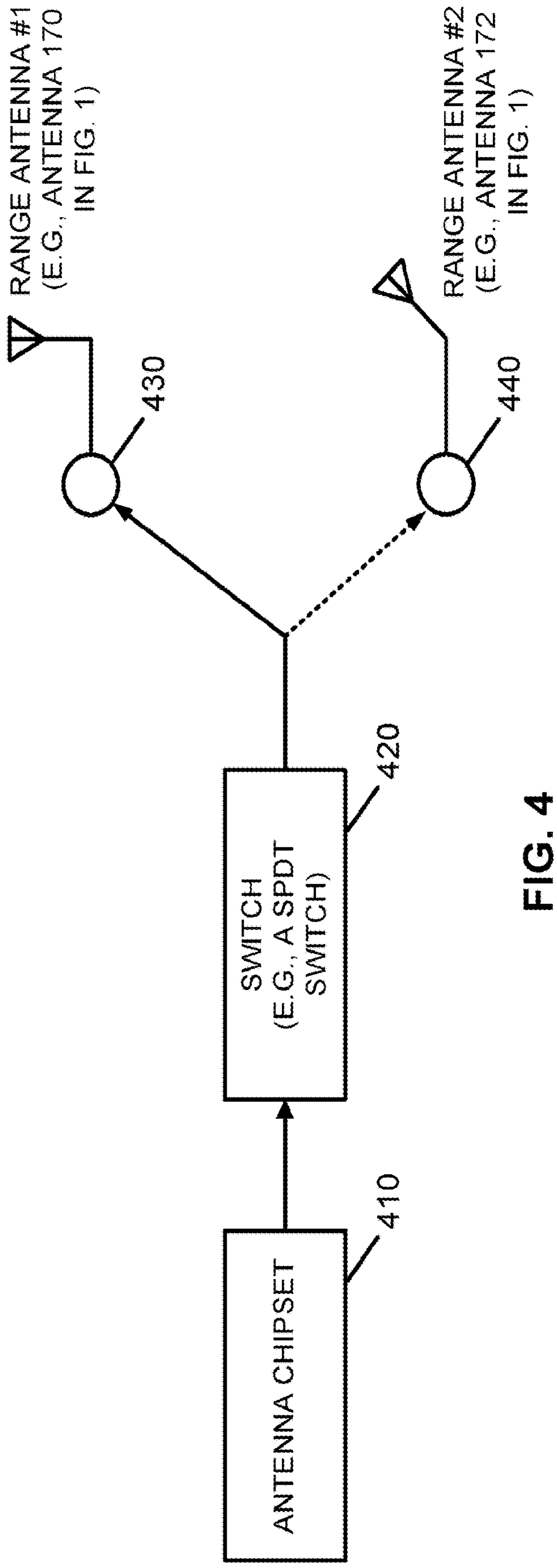
FIG. 4 shows an illustrative example of a switch that can be connected to each range antenna of multiple range antennas on the responder device and that can be used to select one of the range antennas in accordance with some embodiments of the disclosed subject matter.

A more particular example of a switch within responder device 220 is shown, for example, in FIG. 4. As shown, an antenna chipset or any other suitable processing system 410 can be connected to a switch 420, where switch 420 is connected with a first range antenna (e.g., range antenna 170 in FIG. 1) at pole 430 and where switch 420 is connected with a second range antenna (e.g., range antenna 172 in FIG. 1) at pole 440. It should be noted that switch 420 can be connected with any suitable number of range antennas.

It should also be noted that, in some embodiments, antenna chipset or any other suitable processing system 410 on responder device 220 can determine whether another antenna present on the responder device is capable of transmitting a signal to the one or more angle-of-arrival antennas on initiator device 210. For example, for responder devices having a single range antenna, antenna chipset or any other suitable processing system 410 on the responder device 420 can determine other antennas on responder device 220 that are currently configured to provide different signals (e.g., a WiFi antenna, a GPS antenna, etc.) and which of those antennas is capable of providing a signal to the angle-of-arrival antennas on initiator device 210. In continuing this example, responder device 220 can determine a polarization of this alternate antenna and, in response to determining that the polarization of the alternate antenna is sufficient (e.g., substantially orthogonal polarization to the single range antenna on responder device 220), can transmit an instruction that changes the state of switch 420 such that the alternate antenna is used to transmit a signal to the angle-of-arrival antennas on initiator device 210. This can, for example, reconfigure an existing antenna that is currently configured to transmit other types of signals to transmit a signal to the angle-of-arrival antennas on initiator device 210.

Referring back to FIG. 2B, at 270, responder device 220 can use the selected range antenna to transmit radio signals to the angle-of-arrival antennas on initiator device 210. At 275, the angle-of-arrival antennas on initiator device 210 can receive the radio signals from the selected range antenna on responder device 220. As arriving signals from the selected range antenna at an angle (θ) cause a path difference (p) between the pair of angle-of-arrival antennas, a processing system of initiator device 210 can calculate the phase difference of arrival to measure the range antenna angle-of-arrival (AoA) relative to the center of the pair of angle-of-arrival antennas.

It should be understood that at least some of the above-described blocks of the process of FIGS. 2A and 2B can be executed or performed in any order or sequence not limited to the order and sequence shown in and described in connection with the figure. Also, some of the above blocks of the process of FIGS. 2A and 2B can be executed or performed substantially simultaneously where appropriate or in parallel to reduce latency and processing times. Additionally or alternatively, some of the above described blocks of the process of FIGS. 2A and 2B can be omitted.

Figure 5:
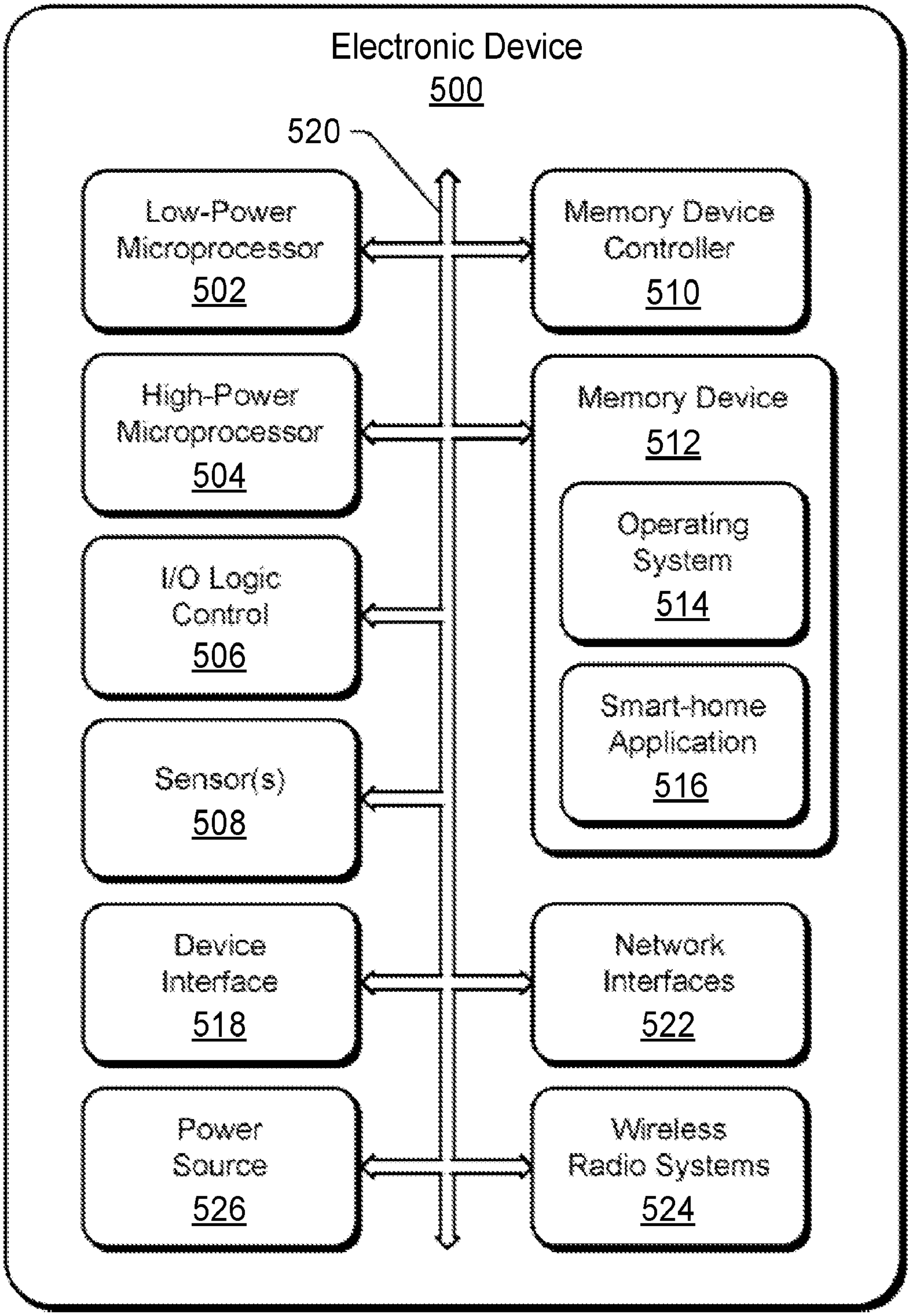
FIG. 5 is a block diagram illustrating an example electronic device that can be implemented as any electronic device that can connect to a wireless network, the electronic device including an antenna system described herein in accordance with some embodiments of the disclosed subject matter.

FIG. 5 is a block diagram illustrating an example electronic device 500 that can be implemented as any electronic device that can connect to a wireless network, the electronic device including an antenna system having multiple range antennas and multiple angle-of-arrival antennas in accordance with one or more aspects as described herein. Electronic device 500 can be integrated with electronic circuitry, microprocessors, memory, input output (I/O) logic control, communication interfaces and components, as well as other hardware, firmware, and/or software to communicate via the network. Further, the electronic device 500 can be implemented with various components, such as with any number and combination of different components as further described with reference to the example device shown in FIG. 6.

In this example, electronic device 500 can include a low-power microprocessor 502 and a high-power microprocessor 504 (e.g., microcontrollers or digital signal processors) that process executable instructions. Electronic device 500 can also include an input-output (I/O) logic control 506 (e.g., to include electronic circuitry). The microprocessors can include components of an integrated circuit, programmable logic device, a logic device formed using one or more semiconductors, and other implementations in silicon and/or hardware, such as a processor and memory system implemented as a system-on-chip (SoC). Additionally or alternatively, electronic device 500 can be implemented with any one or combination of software, hardware, firmware, or fixed logic circuitry that may be implemented with processing and control circuits. Low-power microprocessor 502 and high-power microprocessor 504 can also support one or more different device functionalities of electronic device 500. For example, high-power microprocessor 504 may execute computationally intensive operations, whereas low-power microprocessor 502 may manage less-complex processes such as detecting a hazard or temperature from one or more sensors 508. Low power processor 502 may also wake or initialize high-power processor 504 for computationally intensive processes. For example, low power processor 502 on an initiator device can detect the presence of a responder device and, in response, can wake high-power processor 504 to select a preferred range antenna from the responder device for receiving subsequent signals.

One or more sensors 508 can be implemented to detect various properties such as acceleration, temperature, humidity, water, supplied power, proximity, external motion, device motion, sound signals, ultrasound signals, light signals, fire, smoke, carbon monoxide, global-positioning-satellite (GPS) signals, radio-frequency (RF), other electromagnetic signals or fields, or the like. As such, sensors 508 may include any one or a combination of temperature sensors, humidity sensors, hazard-related sensors, security sensors, other environmental sensors, accelerometers, microphones, optical sensors up to and including cameras (e.g., charged coupled-device or video cameras), active or passive radiation sensors, GPS receivers, and radio-frequency identification detectors. In some implementations, electronic device 500 may include one or more primary sensors, as well as one or more secondary sensors, such as primary sensors that sense data central to the core operation of the device (e.g., sensing a temperature in a thermostat or sensing smoke in a smoke detector), while the secondary sensors may sense other types of data (e.g., motion, light, or sound), which can be used for energy-efficiency objectives or smart-operation objectives.

Electronic device 500 can include a memory device controller 510 and a memory device 512, such as any type of a nonvolatile memory and/or other suitable electronic data storage device. Electronic device 500 can also include various firmware and/or software, such as an operating system 514 that is maintained as computer executable instructions by the memory and executed by a microprocessor. The device software may also include a smart-home application 516 that implements aspects of the access point device. The electronic device 500 also includes a device interface 518 to interface with another device or peripheral component, and includes an integrated data bus 520 that couples the various components of the electronic device for data communication between the components. The data bus in the electronic device may also be implemented as any one or a combination of different bus structures and/or bus architectures.

Device interface 518 may receive input from a user and/or provide information to the user (e.g., as a user interface), and a received input can be used to determine a setting. Device interface 518 may also include mechanical or virtual components that respond to a user input. For example, the user can mechanically move a sliding or rotatable component, or the motion along a touchpad may be detected, and such motions may correspond to a setting adjustment of the device. Physical and virtual movable user-interface components can allow the user to set a setting along a portion of an apparent continuum. Device interface 518 may also receive inputs from any number of peripherals, such as buttons, a keypad, a switch, a microphone, and an imager (e.g., a camera device).

Electronic device 500 can include network interfaces 522, such as a network interface for communication with other electronic devices on the network, and an external network interface for network communication, such as via the Internet. Electronic device 500 also includes wireless radio systems 524 for wireless communication with other electronic devices via the network interface and for multiple, different wireless communications systems. Wireless radio systems 524 may include Wi-Fi, Bluetooth, Mobile Broadband, Bluetooth Low Energy (BLE), and/or point-to-point IEEE 802.15.4. Each of the different radio systems can include a radio device, antenna, and chipset that is implemented for a particular wireless communications technology. Electronic device 500 also includes a power source 526, such as a battery and/or to connect the device to line voltage. An alternating current (AC) power source may also be used to charge the battery of the device.

Figure 6:
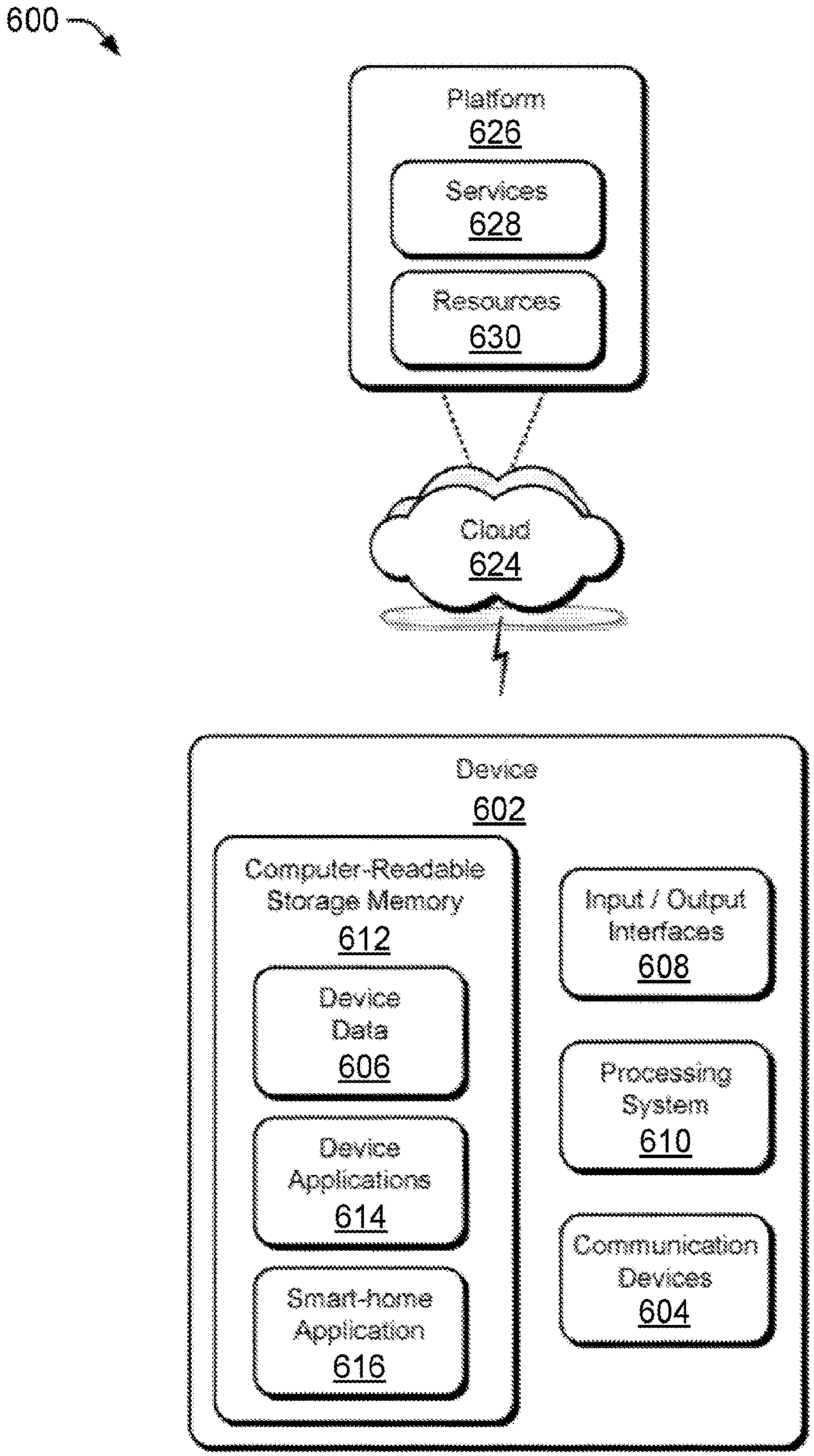
FIG. 6 is a block diagram illustrating an example system that includes an example device, which can be implemented as any electronic device that implements aspects of the antenna system as described with reference to the previous FIGS. 1-5.

FIG. 6 is a block diagram illustrating an example system 600 that includes an example device 602, which can be implemented as any electronic device that implements aspects of antenna system 120 as described with reference to the previous FIGS. 1-5. Example device 602 may be any type of computing device, client device, mobile phone, tablet, communication, entertainment, gaming, media playback, and/or other type of device. Further, example device 602 may be implemented as any other type of electronic device that is configured for communication on a network, such as a thermostat, hazard detector, camera, light unit, commissioning device, router, border router, joiner router, joining device, end device, leader, access point, a hub, and/or other electronic devices.

Device 602 includes communication devices 604 that enable wired and/or wireless communication of device data 606, such as data that is communicated between the devices in a network, data that is being received, data scheduled for broadcast, data packets of the data, data that is synchronized between the devices, etc. The device data can include any type of communication data, as well as audio, video, and/or image data that is generated by applications executing on the device. The communication devices 1204 can also include transceivers for cellular phone communication and/or for network data communication.

Device 602 also includes input/output (I/O) interfaces 608, such as data network interfaces that provide connection and/or communication links between the device, data networks (e.g., an internal network, external network, etc.), and other devices. The I/O interfaces can be used to couple the device to any type of components, peripherals, and/or accessory devices. The I/O interfaces also include data input ports via which any type of data, media content, and/or inputs can be received, such as user inputs to the device, as well as any type of communication data, such as audio, video, and/or image data received from any content and/or data source.

Device 602 includes a processing system 610 that may be implemented at least partially in hardware, such as with any type of microprocessors, controllers, or the like that process executable instructions. The processing system can include components of an integrated circuit, programmable logic device, a logic device formed using one or more semiconductors, and other implementations in silicon and/or hardware, such as a processor and memory system implemented as a system-on-chip (SoC). Alternatively or in addition, the device can be implemented with any one or combination of software, hardware, firmware, or fixed logic circuitry that may be implemented with processing and control circuits. Device 602 may further include any type of a system bus or other data and command transfer system that couples the various components within the device. A system bus can include any one or combination of different bus structures and architectures, as well as control and data lines.

Device 602 also includes computer-readable storage memory 612, such as data storage devices that can be accessed by a computing device, and that provide persistent storage of data and executable instructions (e.g., software applications, modules, programs, functions, or the like). The computer-readable storage memory described herein excludes propagating signals. Examples of computer-readable storage memory include volatile memory and non-volatile memory, fixed and removable media devices, and any suitable memory device or electronic data storage that maintains data for computing device access. The computer-readable storage memory can include various implementations of random access memory (RAM), read only memory (ROM), flash memory, and other types of storage memory in various memory device configurations.

Computer-readable storage memory 612 provides storage of the device data 606 and various device applications 614, such as an operating system that is maintained as a software application with the computer-readable storage memory and executed by processing system 610. The device applications may also include a device manager, such as any form of a control application, software application, signal processing and control module, code that is native to a particular device, a hardware abstraction layer for a particular device, and so on. In this example, the device applications also include a smart-home application 616 that implements aspects of the access point device, such as when example device 602 is implemented as any of the electronic devices described herein.

In some aspects, at least part of the techniques described for the multimode high-isolation antenna system may be implemented in a distributed system, such as over a "cloud" 624 in a platform 626. Cloud 624 includes and/or is representative of platform 626 for services 628 and/or resources 630.

Platform 626 abstracts underlying functionality of hardware, such as server devices (e.g., included in the services 628) and/or software resources (e.g., included as the resources 630), and communicatively connects example device 602 with other devices, servers, etc. Resources 630 may also include applications and/or data that can be utilized while computer processing is executed on servers that are remote from example device 602. Additionally, services 628 and/or resources 630 may facilitate subscriber network services, such as over the Internet, a cellular network, or Wi-Fi network. Platform 626 may also serve to abstract and scale resources to service a demand for the resources 630 that are implemented via the platform, such as in an interconnected device embodiment with functionality distributed throughout system 600. For example, the functionality may be implemented in part at example device 602 as well as via platform 626 that abstracts the functionality of cloud 624.

In some embodiments, any suitable computer readable media can be used for storing instructions for performing the functions and/or processes described herein. For example, in some embodiments, computer readable media can be transitory or non-transitory. For example, non-transitory computer readable media can include media such as non-transitory forms of magnetic media (such as hard disks, floppy disks, etc.), non-transitory forms of optical media (such as compact discs, digital video discs, Blu-ray discs, etc.), non-transitory forms of semiconductor media (such as flash memory, electrically programmable read only memory (EPROM), electrically erasable programmable read only memory (EEPROM), etc.), any suitable media that is not fleeting or devoid of any semblance of permanence during transmission, and/or any suitable tangible media. As another example, transitory computer readable media can include signals on networks, in wires, conductors, optical fibers, circuits, any suitable media that is fleeting and devoid of any semblance of permanence during transmission, and/or any suitable intangible media.

Although the invention has been described and illustrated in the foregoing illustrative embodiments, it is understood that the present disclosure has been made only by way of example, and that numerous changes in the details of implementation of the invention can be made without departing from the spirit and scope of the invention. Features of the disclosed embodiments can be combined and rearranged in various ways.

What is claimed is:

1. An antenna system comprising:

a printed circuit board;

a plurality of range antennas connected to the printed circuit board, wherein a first range antenna of the plurality of range antennas is substantially orthogonal to a second range antenna of the plurality of range antennas such that the first range antenna is approximately ninety degrees out of phase with the second range antenna;

a plurality of angle-of-arrival antennas connected to the printed circuit board; and an alternate antenna connected to the printed circuit board, wherein the alternate antenna is different from the plurality of range antennas and the plurality of angle-of-arrival antennas, and wherein the alternate antenna is configured to transmit other types of signals different than those transmitted by the plurality of range antennas.

2. The antenna system of claim 1, wherein each of the plurality of range antennas are configured to transmit radio signals to an initiator device having a pair of angle-of-arrival antennas.

3. The antenna system of claim 2, wherein the plurality of range antennas include a first range antenna and a second range antenna, wherein the first range antenna is configured to transmit a first signal at a first time to the pair of angle-of-arrival antennas, and wherein the second range antenna is configured to transmit a second signal at a second time to the pair of angle-of-arrival antennas.

4. The antenna system of claim 2, wherein the plurality of range antennas include a first range antenna and a second range antenna and wherein the antenna system further comprises a switch that is connected to the first range antenna and the second range antenna.

5. The antenna system of claim 4, wherein the switch is configured to select one of the first range antenna and the second range antenna for transmitting subsequent signals to an initiator device based on a selection from the initiator device.

6. The antenna system of claim 4, wherein the first range antenna is configured to transmit a first signal at a first time to the pair of angle-of-arrival antennas, wherein the second range antenna is configured to transmit a second signal at a second time to the pair of angle-of-arrival antennas, and wherein the switch is configured to select one of the first range antenna and the second range antenna for transmitting subsequent signals to an initiator device based on signal strength of the first signal received by the pair of angle-of-arrival antennas in comparison with the signal strength of the second signal received by the pair of angle-of-arrival antennas.

7. The antenna system of claim 1, wherein each of the plurality of angle-of-arrival antennas are configured to receive radio signals from a responder device having range antennas.

8. The antenna system of claim 1, wherein the wherein the other types of signals comprise WiFi signals or Global Positioning System (GPS) signals.

9. An electronic device comprising:

a printed circuit board;

a plurality of angle-of-arrival antennas connected to the printed circuit board; and an alternate antenna connected to the printed circuit board, wherein the alternate antenna is different from the plurality of range antennas; and a processing system that is connected to the plurality of angle-of-arrival antennas and the alternate antenna, wherein the processing system is configured to:

transmit a first request to a responder device having a plurality of range antennas, wherein a first range antenna of the plurality of range antennas is substantially orthogonal to a second range antenna of the plurality of range antennas such that the first range antenna is approximately ninety degrees out of phase with the second range antenna, and wherein the first request instructs the responder device to transmit a first signal from the first range antenna at a first time and a second signal from the second range antenna at a second time;

select a preferred range antenna from the first range antenna and the second range antenna based on a comparison of the first signal and the second signal received by the plurality of angle-of-arrival antennas;

transmit a second request to the responder device that selects the preferred range antenna for transmitting subsequent signals to the plurality of angle-of-arrival antennas;

receive antenna information associated with the responder device; and transmit, based on the antenna information, a third request that the responder device reconfigure the alternate antenna to transmit a third signal from the alternate antenna to the plurality of angle-of-arrival antennas, wherein the alternate antenna is configured to transmit other types of signals different than the first signal and the second signal.

10. The electronic device of claim 9, wherein the processing system is further configured to select a first angle-of-arrival channel that is associated with a first angle-of-arrival antenna of the plurality of angle-of-arrival antennas.

11. The electronic device of claim 10, wherein the processing system is further configured to determine which of the first range antenna or the second range antenna is the preferred range antenna based on signal strength at the first angle-of-arrival antenna corresponding to the first angle-of-arrival channel.

12. The electronic device of claim 9, wherein the comparison of the first signal and the second signal received by the plurality of angle-of-arrival antennas further comprises determining a first signal strength of the first signal received by the plurality of angle-of-arrival antennas and a second signal strength of the second signal received by the plurality of angle-of-arrival antennas and comparing the first signal strength and the second signal strength to select the preferred range antenna.

13. The electronic device of claim 9, wherein the processing system is further configured to identify the alternate antenna for transmitting the third signal based on antenna capability information in the antenna information.

14. The electronic device of claim 9, wherein the processing system is further configured to:

determine, based on the antenna information, a polarization of the alternate antenna; and transmit, in response to determining that a polarization of the alternate antenna is substantially orthogonal to the plurality of range antennas, an instruction that changes the state of a switch such that the alternate antenna is used to transmit a signal to the angle-of-arrival antennas on the initiator device.

15. An electronic device comprising:

a printed circuit board;

a plurality of range antennas connected to the printed circuit board, wherein a first range antenna of the plurality of range antennas is substantially orthogonal to a second range antenna of the plurality of range antennas such that the first range antenna is approximately ninety degrees out of phase with the second range antenna;

an alternate antenna connected to the printed circuit board, wherein the alternate antenna is different from the plurality of range antennas; and a processing system that is connected to the plurality of range antennas and the alternate antenna, wherein the processing system is configured to:

receive a first request to transmit a first signal from the first range antenna at a first time and a second signal from the second range antenna at a second time;

transmit, at the first time, the first signal from the first range antenna to a plurality of angle-of-arrival antennas on an initiator device;

transmit, at the second time, the second signal from the second range antenna to the plurality of angle-of-arrival antennas on the initiator device;

select a preferred range antenna for transmitting subsequent signals to the plurality of angle-of-arrival antennas on the initiator device; and reconfigure the alternative antenna to transmit a third signal to the plurality of angle-of-arrival antennas on the initiator device, wherein the alternate antenna is configured to transmit other types of signals different than the first signal and the second signal.

16. The electronic device of claim 15, wherein the preferred range antenna is selected in response to receiving a second request from the initiator device that indicates the preferred range antenna between at least the first range antenna and the second range antenna.

17. The electronic device of claim 15, further comprising a switch that is connected to the first range antenna and the second range antenna.

18. The electronic device of claim 17, wherein the preferred range antenna is selected by changing a state of the switch from a currently selected range antenna to the preferred range antenna for transmitting subsequent signals to the initiator device.

19. The electronic device of claim 17, wherein the switch is configured to select one of the first range antenna and the second range antenna for transmitting subsequent signals to the initiator device based on signal strength of the first signal received by the plurality of angle-of-arrival antennas in comparison with the signal strength of the second signal received by the plurality of angle-of-arrival antennas.

20. The electronic device of claim 15, wherein the processing system is further configured to determine whether the alternate antenna on a responder device is capable of being reconfigured to transmit signals as a range antenna to the plurality of angle-of-arrival antennas on the initiator device.

* * * * *